United States Patent [19]
Oas

[11] Patent Number: 5,112,213
[45] Date of Patent: May 12, 1992

[54] DRIVEN RING-TYPE NON-RETURN VALVE FOR INJECTION MOLDING

[75] Inventor: David C. Oas, Westlake, Ohio

[73] Assignee: Van Dorn Company, Cleveland, Ohio

[21] Appl. No.: 660,513

[22] Filed: Feb. 26, 1991

[51] Int. Cl.5 .............................................. B29C 45/52
[52] U.S. Cl. ...................................... 425/562; 366/79; 425/563; 425/587
[58] Field of Search ............... 425/146, 562, 563, 564, 425/577, 587, 207, 208; 264/328.12; 366/77, 79

[56] References Cited

U.S. PATENT DOCUMENTS

| | | | |
|---|---|---|---|
| Re. 30,335 | 7/1980 | Johansson | 425/548 |
| 3,007,202 | 11/1961 | Wucher | 425/146 |
| 3,319,299 | 5/1967 | Kiraly | 366/77 |
| 3,501,810 | 3/1970 | Powell | 425/563 |
| 3,590,439 | 7/1971 | Swanson | 137/533.17 |
| 3,739,958 | 6/1973 | York | 222/404 |
| 3,888,388 | 6/1975 | Mahoney | 222/1 |
| 3,888,393 | 6/1975 | Drori | 222/229 |
| 4,062,479 | 12/1977 | Szabo | 222/495 |
| 4,105,147 | 8/1978 | Stubbe | 222/413 |
| 4,106,113 | 8/1978 | Laimer et al. | 366/79 |
| 4,377,180 | 3/1983 | Biljes | 137/528 |
| 4,477,242 | 10/1984 | Eichlseder et al. | 425/207 |
| 4,512,733 | 4/1985 | Eichlseder et al. | 425/207 |
| 4,530,605 | 7/1985 | Eichlseder et al. | 366/79 |
| 4,557,683 | 12/1985 | Meeker et al. | 425/147 |
| 4,643,665 | 2/1987 | Zeiger | 425/563 |
| 4,767,306 | 8/1988 | Kawaguchi et al. | 425/382.4 |
| 4,850,851 | 7/1989 | Dinerman | 425/562 |
| 4,909,724 | 3/1990 | Sonoda et al. | 425/544 |
| 5,013,233 | 5/1991 | Semmekrot | 425/563 |

FOREIGN PATENT DOCUMENTS 2635144 2/1978 Fed. Rep. of Germany .

OTHER PUBLICATIONS

"Back to Basics: Rethinking Injection Machine Design" by Katashi Aoki, pp. 91–95, Apr. 1987, issue of *Plastics Technology*.

"Machine on Test", pp. 5–11 of *Productivity Series Five* which is adapted from Nov. 1, 1986 issue of *Plastics & Rubber Weekly*, England.

Brochure or catalog pages from Mallard Machine Company and The Japan Steel Works, Ltd. published before the filing data hereof.

*Primary Examiner*—Tim Heitbrink
*Attorney, Agent, or Firm*—Body, Vickers & Daniels

[57] ABSTRACT

A non-return valve for an injection molding machine is provided which includes a conventional tip member threaded into the end of a plasticating screw and carrying therewith an annular valve seat member. An annular check ring receives the tip member. Tang protuberances axially extend from the check ring to rotably engage the retainer end of the tip member. This causes the check ring to couple with the tip member during screw rotation to minimize valve wear while permitting the check ring to axially move relative to the tip member for effecting valve closure by pressure differentials in the normal manner. A ramp surface is provided on the tang protuberances which engages a drive surface on the retainer end of the tip/stud member upon reverse rotation of the screw through a predetermined rotational angle or for a set time to positively close the valve prior to injection.

11 Claims, 4 Drawing Sheets

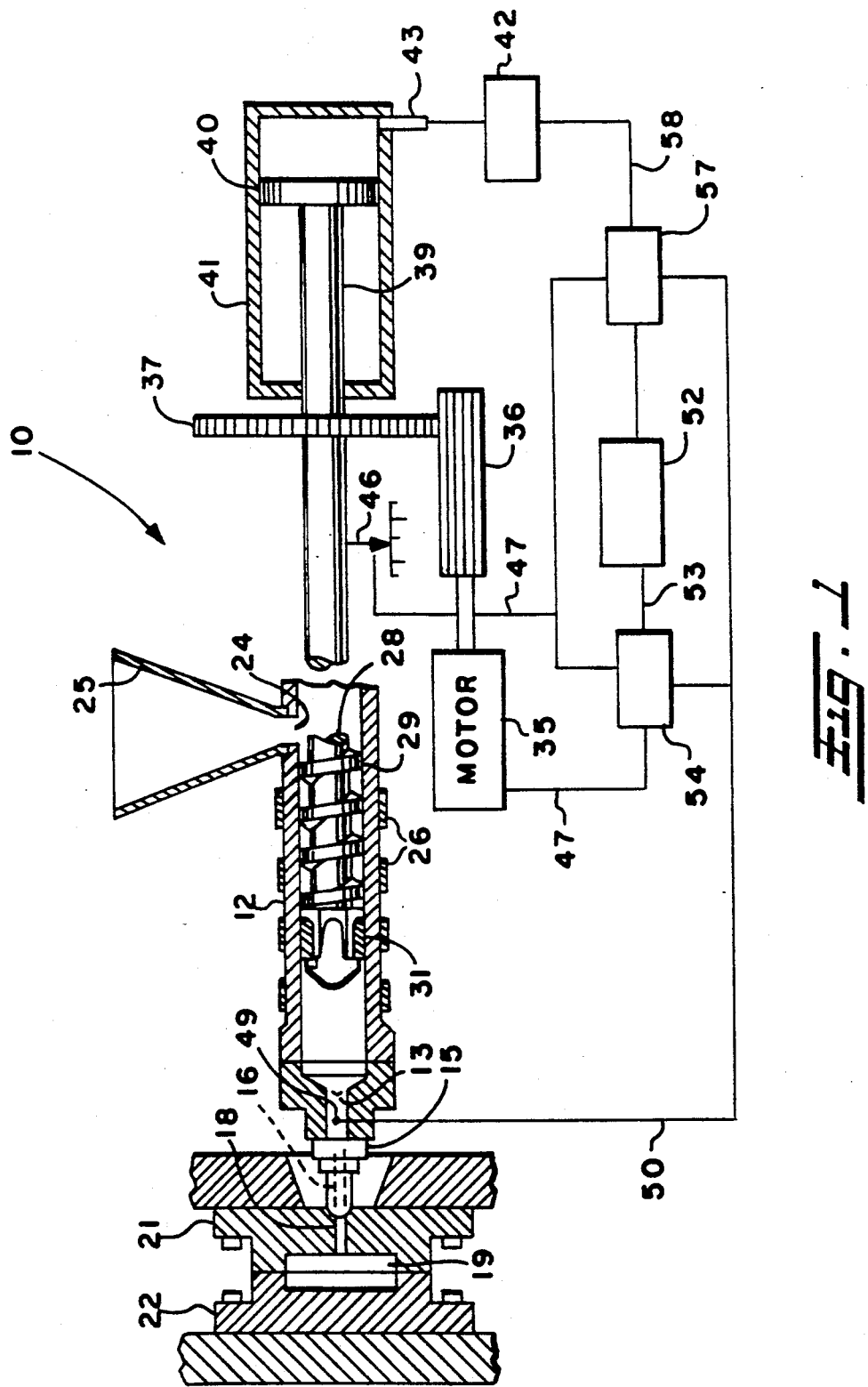

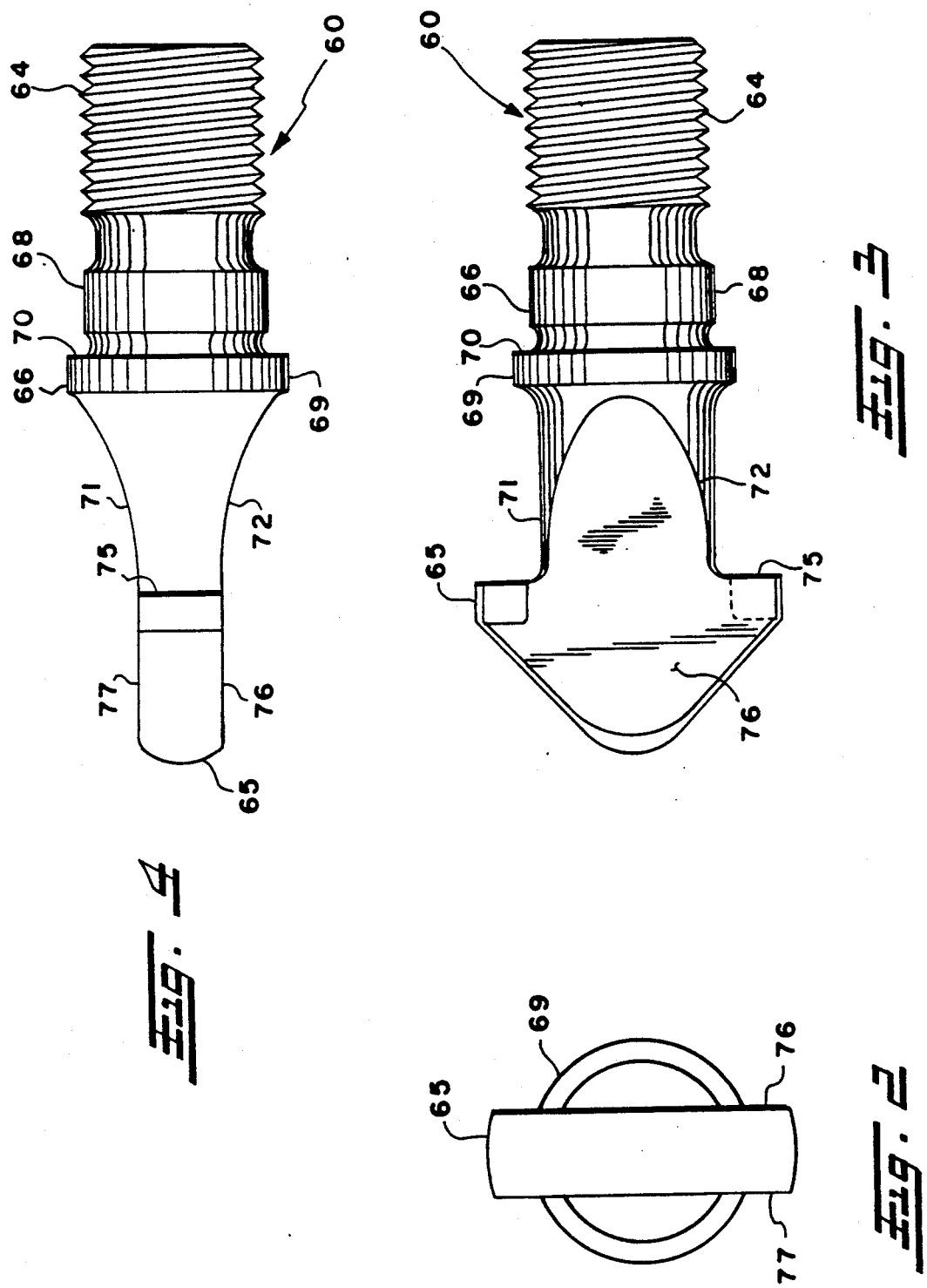

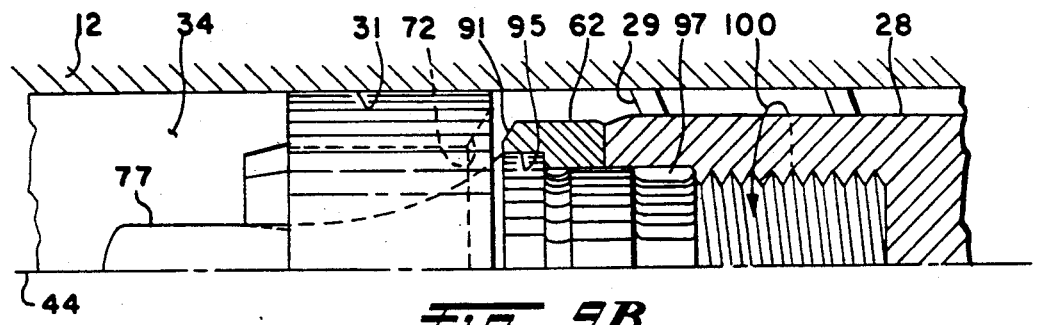
FIG. 9B
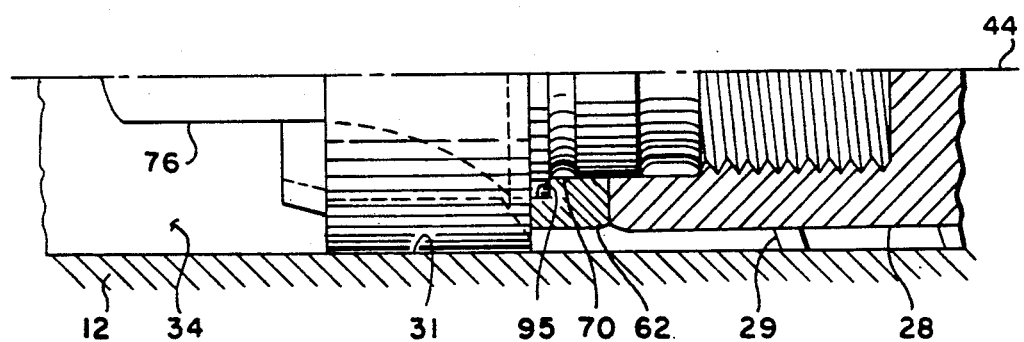
FIG. 9A
FIG. 10A
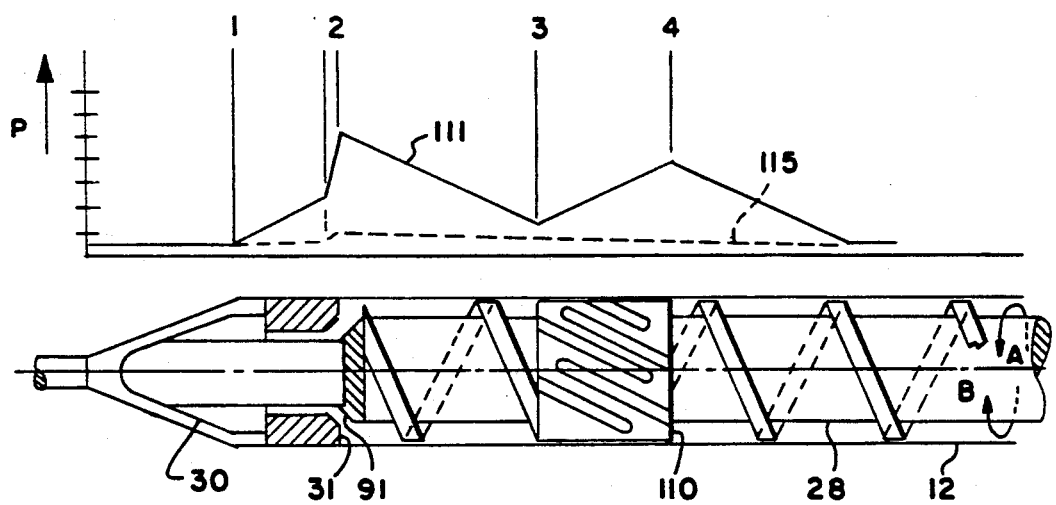
FIG. 10

DRIVEN RING-TYPE NON-RETURN VALVE FOR INJECTION MOLDING

This invention relates generally to the art of injection molding and more particularly to non-return valves used in injection molding machines.

The invention is particularly applicable to and will be described with specific reference to a ring-type non-return or anti-backflow valve. However, the invention in a broader sense relates to an arrangement achieving accurate control of shot size while improving injection efficiency of the injection molding machine.

BACKGROUND

Conventional injection molding machines of the type to which this invention relates include a reciprocating, auger-type plasticating feed screw mounted in a heated barrel for conveying and plasticizing or transforming into a molten state pelletized or granular thermal plastic materials which are fed into the barrel and advanced while being heated to a molten state by the auger type screw to the front end of the barrel whereat a controlled outlet provides fluid communication with a mold. The screw rotates and retracts as the molding material fills the bore space in the barrel between screw end and closed nozzle opening. When a predetermined quantity of molding material is collected in the barrel ahead of the screw, screw rotation is stopped and the screw is forcefully advanced, axially, towards the open outlet. By advancing the feed screw forward towards the nozzle outlet in the barrel, the molding material or shot ahead of the screw is forced or injected from the barrel through the nozzle and into the mold. After injection, screw rotation again starts and the molding material is again collected ahead of the screw in the barrel bore to force the screw to axially retract as pressure builds. The molding sequence is automated and operator variable vis-avis computer commands setting microprocessor controls. Specifically, it is conventionally known practice to control screw rotation and barrel temperature to deposit a predetermined shot in the barrel bore ahead of the screw. It is conventionally known practice to sense shot pressure, screw travel, etc., and control the ram injection pressure (variable or constant) and the rate of flow of molding material into the mold (variable or constant) as well as pressure (ram and mold) control after injection.

In order to insure that the shot is delivered to the mold during the injection stroke, non-return or anti-backflow valves mounted to the front of the screw have long been used in the prior art. Such non-return valves are one-way check valves which are typically classified as either a ball check type valve or a sliding ring-type valve. The present invention relates to sliding ring valves.

Ring type valves typically comprise a tip/stud member having a threaded rear end for attachment to the front of the screw and a retainer nose at its opposite end with a rod or stud portion interconnecting the retainer nose with the threaded end. Attached to the rod portion is a valve seat generally adjacent the threaded end. An annular, axially slidable, check ring fits over the rod portion and is sized to fit closely within the barrel. When the valve is assembled, the check ring is free to axially move until one of its ends contacts the retainer end or its opposite end contacts the valve seat affixed to the tip/stud member. When the screw rotates, flow of the molding material advanced by screw rotation axially slides the check ring into contact with the nose-retainer end and material flows past the open valve seat and then between the ring and stud into the barrel bore. During injection, the shot develops pressure against the check ring adjacent the retainer end and moves the check ring to close against the valve seat. Numerous modifications have been made to ring-type valves to enhance or improve their operation.

One such modification, somewhat pertinent to the present invention, may be described as a driven ring valve and is known in the art. For example, Japan Steel Company and Mallard Machine Company offer such valves. In this type of valve, the forward end of the check ring and the rearward end of the retainer nose are in essence serrated so that rotation of the tip/stud member drives or causes the check ring to rotate. The check ring is still free to axially cycle between the retainer nose and valve seat for opening and closing the valve. Because the check ring and tip/stud member rotate together, wear between retainer nose and check ring is virtually eliminated.

In spite of the developments made in microprocessor controls and computer programming now employed to precisely control flow rates, injection speed, shot size, etc., it has been concluded that control variations necessary in precision molding have not been achieved because of inherent variation in shot size. The problem is generally defined in the April, 1987 issue of *Plastics Technology* at pages 91-95. Secondary valving to improve shut-off operation of the valve is disclosed in the Nov. 1, 1986 issue of English publication *Plastics and Rubber Weekly*. The same type of a concept is disclosed in assignee's prior U.S. Pat. No. 3,319,299. Simply put, shot size injected into the mold is determined by valve closure and valve closure in ring-type valves is dependent upon unequal pressure build-up acting against the check ring. Slight variations in material, temperature, viscosity, etc., inherently affect valve closure making impossible consistent, repeatable shot size. In certain molding applications, shot sizes less than 1% in variation must be constantly produced. A valve relying solely on pressure differentials to move a fixed distance cannot, inherently, produce consistent closures at the accuracy desired for certain molding applications.

Apart from variation in shot size, it is to be appreciated that, in accordance with conventional practice, some movement of the ram or screw during the injection stroke must occur before pressure at the front of the check ring develops sufficient force to close the conventional check ring valve. During injection forward movement, a portion of the shot material travels past the check ring into the barrel where it remains until the next injection stroke. The injection efficiency of injection molding machines operated in the conventional manner with conventional check rings must always be less than theoretical. The loss of shot material is, of course, dependent upon a number of factors and is not limited only to the density of the material. Tests conducted on an injection molding machine having a maximum shot capacity of 38 ounces demonstrated that when the machine was operated at 19 ounces (one half machine capacity), the loss of shot which occurred during the time the valve closed was about 2.8%. However, many times machines are operated at a shot capacity of only 5% to 10% of maximum capacity. At a shot size indicative of 5% of the machine's shot capacity, the loss of shot to close the valve rises to 28.5% of the shot volume initially accumulated ahead of the check ring valve. The prior art has recognized the throughput loss attributed to valve closing which also results in shot variation. Conventional techniques used with conventional check ring non-return valves have included a pullback technique where, prior to the injection stroke, the screw is axially pulled backwards a slight distance within the barrel. It has been found that use of the pullback technique makes the check ring more responsive to valve closure upon initiation of the injection stroke with the result that throughput is increased. However, the pull-back technique can cause "splay" on the molded plastic parts causing the parts to be defective. Thus, application of pull-back can be limited and is dependent upon mold design or application.

SUMMARY OF THE INVENTION

Accordingly, it is a principal object of the present invention to provide an improved, non-return valve and/or method for operating same which permits consistent shot sizes to be injected into a mold.

This object along with other features of the invention is achieved in a non-return valve assembly for an injection molding machine having a plasticating screw disposed within the barrel and rotatable in either direction. The valve includes a tip/stud member having a rearward end adapted to be removably affixed to the forward end of the plasticating screw, a configured forward retainer end and an intermediate rod-like portion between the retainer and rearward ends. An annular check valve seat member adjacent the rearward end is adapted to be fixed to the forward end of the plasticating screw when the rearward end of the tip/stud member is affixed to the plasticating screw. An annular check ring concentrically receives the rod portion of the tip/stud member and is adapted to axially and radially move relative to the rod portion between the retainer and rearward end of the tip/stud member. The check ring has a valve seat formed on its rearward end and a forward end defined by a forward annular edge surface. A cam mechanism associated with the forward annular edge surface of the check ring member and the retainer end positively forces, through contact between the check ring and retainer end, the check ring valve seat to sealingly close against the annular valve seat member when the plasticating screw rotates in a direction opposite to that whereat molding material flows from the screw through the check ring whereby a consistent, repeatably formed shot of molding material is formed in the barrel prior to injection.

In accordance with another aspect of the invention, a drive coupling mechanism associated with the retainer end of the tip/stud member and the check ring is provided for rotating the check ring with the tip/stud member when molding material flows from the plasticating screw through the check ring past the retainer end upon rotation of the plasticating screw in a shot forming direction whereby valve wear between retainer end and check ring is minimized. More specifically, the retainer end has a flange edge surface radially extending outwardly from the rod portion and generally flat profile surfaces in the shape of an arrowhead extending from the laterally spaced ends of the flange edge surface. The check ring has a pair of diametrically opposed tangs axially protruding from the forward annular edge surface, each tang having a contact surface at one side thereof axially extending a distance greater than the movement of the check ring relative to the rod portion and the contact edge surface of one tang is circumferentially spaced from the contact edge surface of the other tang a distance at least equal to the distance the flange edge surface extends between the profile surfaces. Thus, the drive coupling mechanism includes the contact edge surfaces of the tangs and the profile surfaces of the retainer end in contact with one another when the tip/stud member rotates in a shot forming direction whereby the check ring rotates with said tip/stud member in a radially and axially separable manner.

In accordance with yet another specific feature of the invention, the camming mechanism includes an annular cam ramp surface adjacent the tang's contact edge and extending about the check ring's forward annular edge for a fixed arcuate distance from the tang's contact edge to an entry edge. The entry edge is generally adjacent the annular edge surface of the check ring so that the cam ramp surface increasingly axially protrudes from the check ring as it extends from the entry edge to the contact edge and the flange surface of the retainer end contacts the ramp surface of the tang upon reverse rotation of the screw to positively seal the valve seat against the annular check valve seat member.

In accordance with another aspect of the invention, an injection molding machine includes a cylindrical barrel having an outlet opening at one end thereof for injecting molding material into a mold, a plasticating screw disposed within the barrel, a hopper for feeding a molding material to the barrel, a reversible motor for rotating the screw, an injection mechanism for axially moving the screw within the barrel, a control mechanism for controlling the motor and injection mechanisms and a non-return valve affixed to the screw between the barrel opening and the screw. The improvement includes the valve having a tip/stud member with a forward retainer end, a rearward end affixed to the screw so that the tip member rotates with the screw and an intermediate rod-shaped portion between the ends. A valve seat member is provided adjacent the rearward end of the tip member. A check ring member concentrically receives the rod portion of the tip/stud member and is radially and axially movable between the forward end of the tip member and the valve seat member. A coupling mechanism on the check ring and the forward end of the tip/stud member rotationally couples the check ring with the tip/stud member when the motor mechanism rotates the screw in a first direction whereby molding material is deposited in the barrel in front of the non-return valve while axially driving the check ring into sealing engagement with the valve seat member upon reversing the direction of the screw's rotation. More specifically, the coupling mechanism includes a drive mechanism for permitting the check ring to axially move relative to the rod portion of the tip/stud member to seat against the retainer end and to move away therefrom. The coupling mechanism also includes a cam mechanism effective to mechanically move the check ring into sealing contact with the valve seat member upon reversal of rotational direction of the screw, and the screw motor is operative to drive the screw in the first rotational direction and reverse the rotational direction and the control means is effective to control the reverse rotation at predetermined angular increments either through direct angular measurements or through a timed period of reverse rotation or by measuring motor torque developed, etc.

In accordance with yet another aspect of the invention, a process is provided for injecting consistent, repeatable shot sizes of molding material from an injection molding machine into a mold. The injection machine has an auger type plasticating screw axially and rotatably movable within a barrel and an anti-backflow valve attached to the forward end of the screw. The process includes the sequential steps of: a) rotating the screw in a material accumulating direction until a predetermined amount of molding material has been accumulated in the barrel ahead of the antibackflow valve; b) rotating the screw in the opposite direction of rotation while holding the axial position fixed to close the anti-backflow valve thus establishing a precise quantity of material or shot size in the barrel ahead of the anti-backflow valve; and c) axially moving the screw in the barrel to inject the precise shot of molding material in the barrel ahead of the anti-backflow valve into the mold.

In accordance with a still further aspect of the invention, there is provided a method or process for operating an injection molding machine having a conventional check ring, anti-backflow valve or a driven ring anti-backflow valve in which after a predetermined shot size is accumulated ahead of the check ring upon rotation of the screw in the conventional manner, the screw rotation is reversed for a predetermined time period or degree of angular rotation prior to the injection stroke whereby the pressure distribution on the check ring is changed so that a more responsive valve action is achieved.

It is an object of the invention to provide a non-return valve, or a non-return valve in combination with an injection molding machine or an injection molding machine which permits the formation of consistently repeatable shot sizes which are injected into the mold.

It is yet another object of the invention to provide a non-return valve or a non-return valve in combination with an injection molding machine or an injection molding machine or a method for operating an injection molding machine in which a positive anti-backflow valve closure is achieved to produce consistently repeatable, accurately controlled shot sizes which can be injected into a mold.

In accordance with the principal objects stated above, it is still yet another object of the invention to provide a non-return valve arrangement in which throughput of the injection molding machine is improved by minimizing loss of shot size.

It is yet another separate object of the invention to provide a driven ring anti-backflow valve for use in an injection molding machine which is open in design to provide improved unrestricted material flow through the valve.

It is yet another object of the invention to provide a driven ring anti-backflow valve which utilizes a coupling connection whereby the ring remains free to axially and radially shift relative to the tip/stud member to avoid excessive barrel wear.

It is still yet another object of the invention to provide a multi-purpose driven ring anti-backflow valve which can be actuated to a closed position either by pressure differential in a conventional manner or by being mechanically driven to a positively closed position.

It is still yet another object of the invention to provide a control process for operating an injection molding machine to insure that shot sizes are consistently and reliably produced for precision molding of certain articles.

It is still another object of the invention to provide an anti-backflow valve with improved wear characteristics.

Still yet another object of the invention is the utilization of reverse screw rotation with or without fixed axial screw position for improving valve closure response and injection molding machine throughput for any check ring non-return valve in general and more specifically for the open flow, driven check ring non-return valve disclosed herein which is not mechanically driven to a closed position.

These objects and other features of the present invention will become apparent from the following description of the invention taken together with the accompanying drawings.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein:

FIG. 1 is a schematic illustration of an injection molding machine employing the non-return valve of the present invention;

FIG. 2 is an end view of the tip/stud member used in the present invention;

FIG. 3 is a side view of the tip/stud member shown in FIG. 2;

FIG. 4 is a top view of the tip/stud member shown in FIG. 3;

FIG. 9a is a partial top view of the valve assembly showing the check ring in a closed position with the screw and barrel of the injection machine only shown in crosshatched section.

FIG. 9b is a view similar to FIG. 9a but showing the check valve in an open position;

FIG. 10 is a schematic axial view of a portion of the injection molding machine; and FIG. 10a is a graph of the pressure distribution (y-axis) developed along the length of the extruder screw (x-axis) shown in FIG. 10.

DETAILED DESCRIPTION OF THE PREFERRED EMBODIMENT

Figure 5:
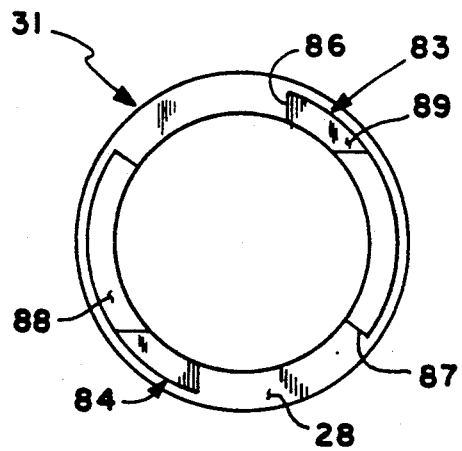
FIG. 5 is a front end view of the check ring used in the present invention.

Referring now to the drawings wherein the showings are for the purpose of illustrating a preferred embodiment of the invention only and not for the purpose of limiting the same, there is shown in schematic form in FIG. 1 an injection molding machine 10 preferably of the type which injects plastic or a plastic type material into a mold but which, in concept, can also be used for die casting of metals and other material which upon application of heat assume fluidic characteristics, all such material hereinafter referred to as molding material. Injection molding machine 10 includes an axially extending barrel 12 which has an outlet 13 at its forward end which can be viewed as an orifice. In practice, a nozzle 15 is secured to outlet 13 and nozzle 15 has a passageway 16 communicating with a sprue 18 for feeding molding material to a mold cavity 19. Mold cavity 19 is formed from two halves of a mold 21, 22 which are brought together and held together in a timed sequence by means of a hydraulically actuated clamp (not shown). Molding material is disposed at an inlet end 24 of barrel 12 by means of a conventional feed hopper 25. Electrical band heaters 26 are provided for heating barrel 12 in a precise arrangement by a control mechanism (not shown).

Disposed within barrel 12 is an axially extending plasticating screw 28. Plasticating screw 28 has helically shaped threads or flights 29 extending from its stem to the barrel for conveyance of molding material from inlet 24 to outlet 13 in an auger-type manner. Affixed to the forward end of screw 28 is an anti-backflow or non-return valve 30. Non-return valve 30 includes an annular check ring 31 which axially moves within barrel 12 to admit or prevent flow of molding material through non-return valve 30 to the forward end of barrel 12. For terminology purposes herein, the space within barrel 12 ahead of non-return valve 30 through to and including barrel outlet 13 which space contains a shot of molding material (which may be varied or variable) will be defined as shot space 34.

Screw 28 is rotated by a motor 35 through a suitable gear train 36, 37. As the plasticized molding material is conveyed by rotation of screw 28 towards barrel outlet 13, the volume of molding material at the forward end of barrel 13 increases resulting in an increase in shot space 34 and screw 28 is axially displaced toward the right, as viewed in FIG. 1 away from nozzle 15 in which a shut-off valve (not shown) is disposed.

The rearmost end 39 of screw 28 includes a piston 40 which is slidably received within a cylinder 41. A variable displacement pump 42 is in fluid communication with the back face of piston 40 through a conduit 43 and maintains a back pressure on the molding material.

As thus far defined, molding material in a softened, plasticated state passes from screw flights 29 through non-return valve 30 into shot space 34 while screw 28 is rotated by motor 35. When a desired quantity of molding material has been collected in shot space 34, which is normally referred to as "shot", rotation of screw 28 is stopped. In the normal conventional operation of injection molding machine 10, high pressure fluid from pump 42 is then delivered through conduit 43 against piston 40 while the nozzle shutoff valve (not shown) is opened and piston 40 causes screw 28 to move toward the left as viewed in FIG. 1 thus causing the shot in shot space 34 to pass through outlet 13, passageway 16, sprue 18 and into mold cavity 19. Pressure is maintained on the molding material within mold cavity 19 until the mold has cooled the molding material to a solidified state. At that time, the nozzle shut-off valve (not shown) is closed and screw rotation is again started and the cycle is again repeated to provide successive molded parts.

Within the injection molding art, programmable controls have been developed which, assuming a consistently reliable non-return valve 30, will accurately collect a predetermined quantity of shot and then inject the shot at precisely controlled rates into mold cavity 19 which rates may vary during the injection cycle. A conceptually conventional control arrangement used to regulate shot size and flow rate is schematically illustrated in FIG. 1. The arrangement includes a conventional position indicating device 46 associated with screw 28 which generates an electrical feedback signal on electrical line 47. Similarly, a pressure transducer 49 associated with shot space 34 so as to measure the pressure of the molding material within shot space 34 generates an electrical feedback pressure signal on line 50. A programmable master controller 52 such as a computer generates a pre-programmed electrical signal on line 53 which controls motor 35 and this signal is compared to the electrical position indicating signal on line 47 and the pressure signal on line 50 in a conventional, closed loop motor feedback circuit 54 which in turn develops a signal that controls motor 35. Similarly, master controller 52 generates a pre-programmed signal for controlling pump 42 which during the injection cycle is compared to position indicating signal on line 47 and pressure signal on line 50 and a conventional pump, closed loop feedback circuit 57 develops a signal inputted on line 58 to control pump 42. This control arrangement permits an accurate quantity of shot to be collected in shot space 34 and a controlled injection of the molding material during the injection stroke. As is well known in the injection molding art, precision molding requires that the shot size consistently vary less than 1% and that the rate at which the shot is injected into mold cavity 19, may be varied during the time of the injection cycle to produce molded parts having desired physical characteristics. Physical characteristics could include molded parts which do not have flow lines through thin sections of the part which can typically occur when the mold is designed so that the thin sections of the finished part feed thick sections of the molded part.

For purposes of the subject invention, it should or will be clear that motor 35 is of the reversing type, and it is also to be understood that axial position indicator 46 can sense degrees of screw 28 rotation and develop a feedback signal to control reverse rotation of screw 28. It should also be apparent that computer 52 alternatively can function as a simple timer to control reverse rotation. The actual circuits by which any of the control functions described are believed conventional are readily available to those skilled in the art and thus are not shown or described in detail herein. The circuitry per se does not form part of the present invention. It is believed sufficient to simply note that reverse rotation of screw 28 can be accurately controlled by either measurement of shaft rotation or timing shaft rotation or combination thereof.

Non-return valve 30 of the present invention is a three-piece valve assembly which includes a tip member hereinafter referred to as tip/stud member 60 shown in FIGS. 2–4, a check ring 31 shown in FIGS. 5 and 6, and an annular valve seat member 62 shown in FIGS. 8a, 8b, 9a and 9b.

Referring now to FIGS. 2–4, tip/stud member 60 has a rearward end 64, a retainer forward end 65 and a rod portion 66 extending between rearward end 64 and retainer end 65. Rod portion 66 has a first cylindrical seat surface 68 adjacent rearward end 64 which abuts against a larger second cylindrical seat surface 69. As will be shortly explained, first and second cylindrical seat surfaces 68, 69 function to retain annular valve seat member 62 relative to screw 28. Rod portion 66 then includes a transition surface 71 which as best shown in FIGS. 3 and 4 is cylindrical adjacent second cylindrical seat surface 69 and tapers along transition line 72 into the rectilinear configuration of retainer end 65. The configuration of retainer end 65 includes a drive cam surface 75 which has a discrete width and which radially extends outwardly from transition surface 71 a fixed distance. Extending axially forwardly from each edge of drive cam surface 75 is a profile bearing surface 76, 77 there being two such profile surfaces, one extending from each edge of cam surface 75. Each profile bearing surface 76, 77 is a generally flat surface and is shaped in an arrowhead configuration with the tip of the arrowhead at the foremost forward edge of retainer end 65.

In the preferred embodiment, drive cam surface 75 and check ring surface 88 are each segments of a helical type barrel cam surface. Surface 75 is of sufficient area to reduce contact stress between surfaces 75 and 88 below that which would cause surface wear when surfaces 75 and 88 are in sliding contact relationship during valve closure with reverse rotation of screw. As will be explained in further detail hereafter, drive cam surface 75 will axially displace check ring 31 upon reverse rotation of screw 28. Those skilled in the art will appreciate that check ring 31 is free to float in barrel 12 and what prevents check ring 31 from rotating in the direction of screw 12 when screw rotation is reversed is the viscous shear characteristics of the plastic film between the ID of barrel 12 and the OD of check ring 31. The viscous shear characteristics of the plastic acting over the entire OD surface area of check ring 31 thus provides a "retarding torque" resisting reverse rotation of check ring 31. When drive cam surface 75 contacts check ring 31, the "retarding torque" will be reduced by the value of the frictional force generated between drive cam surface 75 and check ring 31. If the frictional force between surfaces 75 and 88 becomes great enough to reduce the "retarding torque" to zero, check ring 31 will rotate in the reverse direction of screw 12 and prevent valve closure. However, it is within the scope of the present invention to reduce the frictional force developed by contact between drive cam surface 75 and surface 88 of check ring 31 by modifying the drive cam surface 75 to include cylindrical cam rollers. Cylindrical rollers positioned on drive cam surface 75 (not shown) produce only rolling friction which would not develop significant forces acting in opposition to the retarding torque. Specifically, this modification would constitute the preferred embodiment of the invention where plastic material exhibits low value of retarding torque at normal operational settings.

Figure 6:
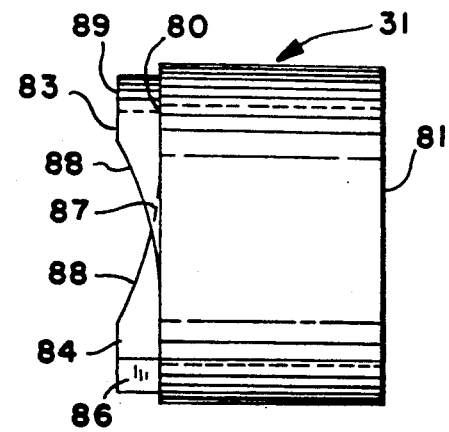
FIG. 6 is a side view of the check ring shown in FIG. 5.

Referring next to FIGS. 5 and 6, check ring 31 is an annular ring having a forward annular edge surface 80 and a rearward annular edge surface 81. Rearward annular edge surface 81 could either be frusto-conical or ring shaped in configuration. The outside diameter of check ring 31 is sized closely to fit within barrel 30 in accordance with conventional practice so that molding material does not flow between ring OD and the barrel. The inside diameter of check ring 31 is larger than the diameter of second cylindrical surface 69 so that it can slide thereover but less than the outermost radial distance of cam surface 75 so that forward edge 80 of check ring 31 cannot slide past retainer end 65. Axially protruding from annular forward edge 80 is a pair of protuberances or tangs 83, 84 which are diametrically opposed to one another. Each tang 83, 84 has an axially extending contact edge surface 86 which extends axially forwardly from forward annular edge 80 a distance not less than, and preferably slightly greater than, the axial distance which check ring 31 can travel relative to tip/stud member 60. Each tang 83, 84 circumferentially extends about forward annular surface 80 a fixed arcuate distance defined as that distance extending between contact edge surface 86 and an entry edge line 87. In the preferred embodiment of check ring 31 shown in FIGS. 5 and 6, entry edge 87 is coincident with forward annular edge surface 80. Thus, the face of each tang includes a cam ramp surface 88 which is arcuate as best shown in FIG. 6 and which extends over a circumferential portion of each tang 83, 84 from leading edge 87 until terminating in a flat surface 89 which extends to and terminates adjacent to contact edge surface 86.

Referring next to FIGS. 7, 8a, 8b, 9a and 9b, non-return valve 30 is shown in its assembled, unsectioned configuration but in FIGS. 8a, 8b, 9a, and 9b, for reference purposes, non-return valve 31 is inserted into barrel 12 and screw 28 which are shown sectioned. Further, non-return valve assembly 30 in FIGS. 8a, 8b, 9a and 9b, is split into halves along its axially extending centerline 44 to better show the open and closed positions of check ring 31. Further, FIGS. 7, 8a, 8b, 9a and 9b show, for purposes of illustration and to indicate the invention has patentable features without mechanically driving check ring 31 into a closed position, tangs 83, 84 which do not have cam ramp surfaces 88.

Annular valve seat member 62 is shown with a frusto-conical valve seat surface 91 which is adapted to mate with a similar frusto-conical valve seat surface 92 formed in check ring 31. Annular valve seat 62 has a first inside cylindrical surface 94 adjacent its rearward end of a diameter substantially equal to first cylindrical surface 68 on tip/stud member 60 so as to tightly fit thereabout. Annular valve seat 62 also has a second internal cylindrical surface area 95 adjacent its front end which is adapted to tightly fit against second cylindrical surface 69 of tip/stud member 60.

Non-return valve 30 is assembled by sliding check ring 31 over rod portion 66 of tip/stud member 60 and then sliding annular valve seat 62 over rearward end 64 of tip/stud member 60. For drawing purposes and ease of explanation, rearward end 64 is shown as threaded in a conventional manner. A wrench grabbing flat profile surfaces 76, 77 rotates rearward end 64 of tip/stud member 60 into threaded engagement with a centrally threaded opening 97 in screw 28 and as tip/stud member 60 is threaded into screw bore 97, annular valve seat 62 is forced over first and second cylindrical surfaces 68, 69 of tip/stud member 66 until annular valve seat 62 is compressed between an axial end face 98 of screw 28 and a radially extending flange formed between first and second cylindrical surfaces 68, 69 of tip/stud member 60. As will be shortly explained because screw 28 will rotate, clockwise and counterclockwise, in accordance with the teachings of the invention, provisions can be made to the connection between rearward end 64 and threaded opening 97 to prevent unscrewing (or loosening) of non-return valve 30. For example, tip/stud member 60 can be tightened to a minimum torque level which will be sufficient to prevent unscrewing of rearward end 64. Other conventional mechanisms can be used. For example, a flat on the threaded end of rearward end 64 could be provided and a threaded cross bore provided in screw 28 so that a set screw in the bore will seat against the flat to prevent rotation of tip/stud member 60. Alternatively, a lock washer can be provided. Other mechanisms preventing loosening of tip/stud member 60 which permitting removable attachment of rearward end 64 from screw 28 will suggest themselves to those skilled in the art.

As thus assembled, tip/stud member 60 and annular valve seat 62 are affixed to screw 28 so that both members axially move and rotate with screw 28. Check ring 31 rotates with tip/stud member 60 in the drive or molding material feed direction of rotation of screw 28 indicated by arrow 100 in the drawings because of contact between contact surface 86 and profile surface 76 for first tang 83 and contact between contact surface 86 and second profile surface 77 for second tang 84. While check ring 31 rotates with tip/stud member 60 in the molding material feed direction, check ring 31 is free to axially move within rod portion 66 of tip/stud member 60. More specifically, check ring 31 can axially move between the position shown in FIGS. 8a and 9a whereat valve seat surfaces 91, 92 contact one another to the position shown in FIGS. 8b and 9b whereat forward leading annular edge surface 80 of check ring 31 contacts drive cam surface 75 of tip/stud member 60. The movement is possible because tang contact surfaces 86 can slide relative to side profile surfaces 76, 77. Further, check ring 31 can assume to the extent permissible within barrel 12 attitudinal angular relationships relative to longitudinal centerline 44. Thus, check ring 31 is a freely floating member capable of moving axially and radially and as described thus far and with reference to the check ring configuration shown in FIG. 7 will rotate with tip/stud member 60. (As an aside, it should also be noted that retainer end 65 could be modified to have a plurality of flange surfaces 75 and a plurality of opposed tangs 83, 84 and the coupling will still work. While a plurality of driving connections could be employed, it is preferred that only two tangs 83, 84 be used as described from a material flow consideration.) In connection with the driven rotation of check ring 31, it should be noted that the axial distance or protrusion depth of contact surface 86 as in to FIGS. 8a and 8b relative to FIGS. 9a and 9b is longer than the axial travel limits of check ring 31 within rod portion 66 of tip/stud member 60 thus assuring driving engagement. As thus far described, wear between retainer end 65 and check ring 31 in non-return valve 31 is eliminated because relative rotation between the members has been eliminated. Wear resulting from the axial sliding motion between tangs 84, 85 and profile surfaces 76, not significant because non-return valve 31 does not axial cycle at a frequency rate anywhere approaching the relative rotational motion of prior art non-return ring valves. What is happening is that the normal valve wear between retainer end 65 and check ring 31 in prior art non-return valves has been transferred in the design of the present invention to relative rotation between check ring 31 and barrel 12. However, this wear is now spread out over an area defined by the outer circumference of check ring 31 multiplied by its axial length and because this wear area has been tremendously increased when compared to wear area between retainer end and check ring of prior art valves, wear is not a significant problem. Further, for wear to occur, there must be both relative motion and a force acting on the parts in contact. Since the ring floats radially, the radial force of the ring on the barrel is reduced to substantially the weight of ring alone compared to the entire weight of the screw and valve as in the case of a ball check type valve. Therefore, wear between check ring and barrel is not a significant factor. Check ring 31 may also be heat treated to a lower hardness than that of barrel screw 12 to prevent barrel wear.

Figure 7:
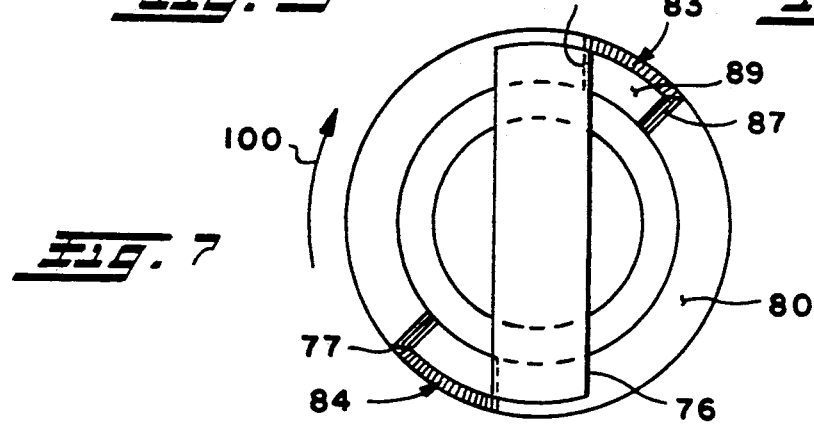
FIG. 7 is a front end view of the valve assembly shown in the present invention but without the cam ramp surfaces.
Figure 8B:
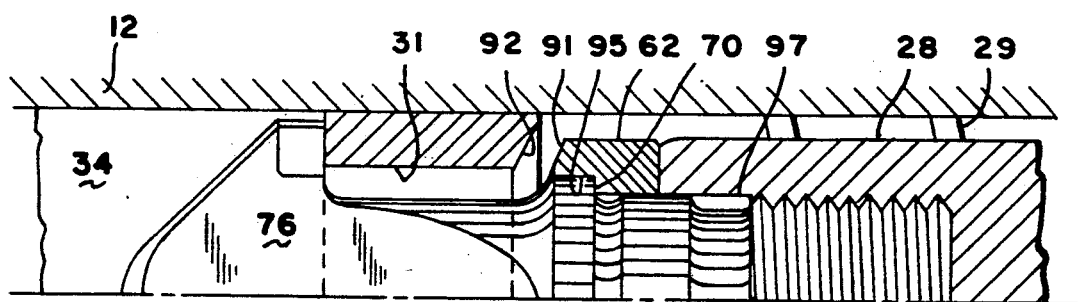
FIG. 8b is a partial view similar to FIG. 8a but with the check valve, shown in an open position.
Figure 8A:
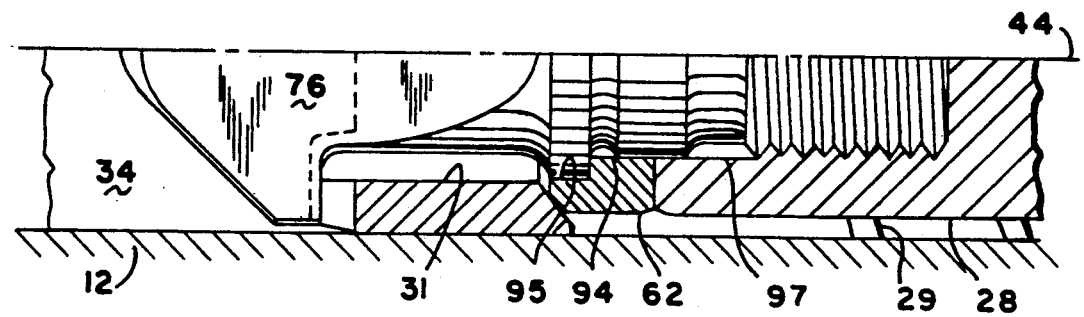
FIG. 8a is a partial side view of the valve assembly showing the check ring in a closed position with only the barrel and screw of the injection machine shown crosshatched.

Another significant feature of the invention as thus far described is the open flow area present in non-return valve 31 when compared to other prior art ring type non-return valves and this open area permits unimpeded passage of various molding materials through non-return valve 31. As best shown in FIG. 7, the flow area in the end view shown extends from the inner diameter of check ring 31 to profile surface 77 on one side and from the inner diameter of check ring 31 to the side profile surface 76 on the other side.

The invention has been described thus far without reference to cam ramp surfaces 88 because non-return valve 30 can be used as disclosed in a conventional injection molding machine without reference to bi-directional screw rotation while still possessing advantages over prior art non-return valves and even over other check ring driven prior art valves. This results because of the drive configuration and the configuration of retainer end 65 of tip/stud member 60. Thus, when non-return valve is to cycle between open and closed position by virtue of molding material pressure differentials, non-return valve 30 is more responsive than prior art non-return valves. This occurs because more surface area of the annular front end face 80 of check ring 31 is exposed to the shot in shot space 34. In non-return valve 30 of the present invention, the area of forward annular edge surface 80 of check ring 31 when covered by the overlying area of drive cam surface 75 nevertheless is significantly greater than prior art valves meaning that the valve 30 of the present invention is less unbalanced and thus faster to move axially in accordance with pressure buildup in the shot in the injecting portion of the cycle. Since the valve is more responsive, this means that a more accurate quantity of shot can be regulated in shot space 34 by pressure differential. As thus far described, non-return valve 30 with the tang configuration which simply includes contact edge surface 86 operates as a conventional non-return valve but is improved in that wear is minimized between check ring 31 and retainer end 65 of tip/stud member 60. In addition, non-return valve 30 has a significantly large open flow area for handling a wide variety of plasticized molding materials which could otherwise be adversely affected by minimal flow rates in prior art non-return valves. Finally, non-return valve 30 is better balanced and more responsive to pressure differentials for quick opening and closing actions.

When check ring 31 is provided with a cam ramp surface 88 shown in the preferred embodiment of the check ring of FIGS. 5 and 6, a significant advance in the control of shot size and anti-backflow art is made possible. As noted above, screw 28 rotates in a first direction whereat molding material is advanced through flights 29 to accumulate in barrel bore 44. At that time, screw rotation is stopped, the shut-off valve in the nozzle (not shown) is opened and piston 40 actuated to inject molding material into mold cavity 19. With the conventional control circuit shown in FIG. 1, it is possible to reverse the rotational direction of shaft 28 through a predetermined fixed and controlled arcuate angle which equates to the axial distance which drive cam surface 75 rides up or axially displaces ramp surface 88 to positively drive valve seat 92 into contact with valve seat 91. This reverse rotation occurs prior to opening the shut-off valve and starting the injection stroke by piston 40. Preferably, the axial position of screw 28 is stationary or fixed within barrel 12 while the screw's rotation is reversed. This can be accomplished by blocking oil flow to and from cylinder 41. Thus, shot material lost is only that volume displaced by axial movement of check ring 31 which for all intents and purposes is negligible. This means that throughput for non-return valve 30 with cam ramp surface 88 is very close to theoretical, especially when it is considered that the axial position of screw 28 does not shift.

Positively and mechanically forcing check ring 31 to close prior to injection prevents varying loss of molding material through non-return valve 31 during the start of the injection stroke. That is, inconsistent closure of a valve operated by pressure differential alone is known to occur for any number of reasons such as pellets not completely plasticized or abrasive materials such as fiberglass strands, etc. This is prevented in the preferred embodiment. Not only is variation in shot weight controlled, but also and importantly, throughput of the injection molding machine is improved. Shot is not lost during the initial forward motion of screw 28 on the injection step as in conventional check ring non-return valves. Because the axial position of screw 28 does not change prior to injection, efficiencies close to theoretical values can be achieved.

In accordance with the general concept of the invention, it is not necessary that the reverse rotation of the screw be driven through a precise rotational angle, although the invention would work if the motor rotation was reversely driven through a measured rotational angle. It is sufficient if only the reverse rotation time of motor 35 is measured and motor rotation stopped upon time out of a preset timer to assure valve closure. Any conventional timer can be employed. With respect to the schematic of FIG. 1, the timer could be set and controlled by master controller 52. Also, if desired, cam ramp surface 68 can be provided with an axially protruding stop at the point where valve closure in the annular check ring member 62 occurs.

Referring now to FIG. 10, there is schematically shown a conventional, check ring non-return valve or alternatively the driven check ring non-return valve 30 of the present invention without the cam ramp surfaces 88, i.e. the valve shown in FIG. 7. The non-return valve 30 is mounted to a screw 28 disposed within a barrel 12 and screw 28, for discussion purposes, is shown as a barrier screw which has a barrier portion 110 well known to those skilled in the art. A bi-directional rotation is imported to screw 28 through a conventional control arrangement such as that illustrated in FIG. 1. Importantly, for this embodiment of the invention, the ram pressure controlled through feedback controller 52 is regulated to maintain screw 28 in a fixed, axial position during reverse rotation. Check ring 31 is shown cross-sectioned in FIG. 10 in its open, shot accumulating position which occurs when screw 28 rotates in the direction of the reference arrow A. FIG. 10a shows diagrammatically the pressure profile developed along screw 28 for a given point of operation. The solid line 111 in FIG. 10a illustrates what the pressure distribution would be just at the end of the shot accumulating stroke prior to start of injection in accordance with conventional, standard molding practice, i.e. at completion of screw rotation in direction A. Pressure at line 1, $P_1$, is the pressure which exists at the front of check ring 31. Pressure at line 2, $P_2$, is the pressure which exists at the rear of check ring 31. Pressure at line 3, $P_3$, is the pressure at the forward end of barrier 110 while pressure at line 4, $P_4$, is the pressure at the rearward end of barrier 110. Barrier 110, by trapping plastic over that portion of screw 28 between lines 2 and 3, thus aggravates or causes a back pressure contributing to higher values of $P_2$.

Pressure graph line 111 thus shows that because $P_2$ is greater than $P_1$, non-return valve 30 is pressure balanced into an open, shot accumulating position. In any pressure operated valve, the valve will not and cannot close until $P_1$ is made greater than $P_2$. Thus, prior to the injection stroke, the non-return valve 20 is pressure biased in the wrong direction. Thus, the valve does not close right away and plastic material is "lost" from the shot and shot size varies.

Heretofore, increasing $P_1$ to be greater than $P_2$ was accomplished in one of two ways or a combination thereof. In performing the standard injection forward stroke to fill the mold (i.e., the injection stroke), two things happen to permit the valve to close. Plastic or molding material flows from screw area between lines or points 2–3 over barrier 110 between lines or point positions 3–4 so that $P_2$ goes down and at the same time, resistance to flow of the plastic or molding material into the mold causes $P_1$ to increase. When $P_1$ becomes greater than $P_2$, non-return valve 30 closes. A second way to change the pressure distribution is the standard pull back technique where screw 28 is axially retracted into barrel 12 (towards the right in FIG. 10) a short axial distance. As noted above, there are drawbacks resulting from the axial shift of screw 28 relating to the molded product, i.e splay. However, when pullback occurs and just prior to the injection stroke, the pressure distribution along the screw and valve would approach or assume the configuration shown by dotted line 115.

In accordance with one of the concepts of the present invention, rotating screw 28 in the reverse direction, that is in the direction of arrow B, can be viewed as "pumping" plastic material in the reverse direction from area between lines 2–3 over barrier portion defined by lines 3–4 so that $P_2$ will drop down immediately. The pressure distribution will assume the general shape indicated by dotted line 115 in FIG. 10a and non-return valve 30 will closely immediately upon start of the forward injection stroke. It is to be appreciated that reverse rotation of the screw 28 is only through a small angle and further the axial position of screw 28 in barrel 12 remains stationary so that shot volume remains constant. Importantly, limitations on the use of the conventional pullback technique which relate to product quality are not present in the invention. Thus, reverse rotation of screw 28 in combination with cam ramp surface 88 permits a positive, mechanically driven shutoff of non-return valve 30. However, reverse rotation of screw 28 in combination with any pressure operated non-return valve will permit the valve to be more responsive because of pressure unloading behind the valve prior to the injection stroke.

The invention has been described with reference to a preferred embodiment. Obviously, modifications and alterations will occur to those skilled in the art upon reading and understanding of the invention disclosed herein. For example, a protuberance could be applied to retainer end 65 of tip/stud member 60 and a groove formed in annular end face 80. Alternatively, a pin or pin with roller or a flight could extend from retainer end 65 and fit within grooves formed on the inside of check ring 31. More than two tangs could be used. It is intended to include all such modifications insofar as they come within the scope of the present invention.

Having thus defined the invention, it is claimed:

1. A non-return valve assembly for use in an injection molding machine including a plasticating screw rotatably and axially movable within a barrel and having means for controlling rotation of said plasticating screw in both clockwise and counterclockwise directions within said barrel, said assembly comprising:
   a) a tip member having a rearward end removably affixed to the forward end of said plasticating screw, a configured forward retainer end and an intermediate rod portion between said retainer and rearward ends;
   b) an annular check valve seat member adjacent said rearward end of said tip member and the forward end of said plasticating screw;
   c) an annular check ring concentrically receiving said rod portion to axially and radially move relative to said rod portion between said retainer and rearward ends of said tip member, said check ring having a valve seat formed on its rearward end and a forward end defined by a forward annular edge surface; and
   d) cam means associated with said forward annular edge surface of said check ring and said retainer end for positively forcing said check ring valve seat to sealingly close against said annular valve seat member through mechanical contact between said check ring and said retainer end when said plasticating screw is rotated in a direction opposite to that whereat molding material flows from said screw through said check ring.

2. The valve assembly of claim 1 further including drive coupling means associated with said retainer end of said tip member and said check ring for rotating said check ring with said tip member when molding material flows from said plasticating screw through said check ring past said retainer end upon rotation of said plasticating screw in a shot forming direction.

3. The valve assembly of claim 2 wherein said retainer end has a flange edge surface radially extending outwardly from said rod portion and terminating at laterally spaced ends, and said retainer end having generally flat profile surfaces in the shape of an arrowhead extending from said laterally spaced ends of said flange edge surface;
   said check ring has a pair of diametrically opposed tangs axially protruding from said forward annular edge surface, each tang having a contact edge surface at one side thereof axially extending a distance greater than the axial movement of said check ring relative to said rod portion and the contact edge surface of one tang circumferentially spaced from the contact edge surface of the other tang a distance at least equal to the distance said flange edge surface extends between said profile surfaces; and
   said drive coupling means includes said contact edge surfaces of said tangs and said profile surfaces of said retainer end in contact with one another when said tip member rotates in a shot forming direction whereby said check ring rotates with said tip member.

4. The valve assembly of claim 3 wherein said cam means includes an annular cam ramp surface adjacent said tang's contact edge surface and extending about said check ring's forward annular edge surface for a fixed arcuate distance from said tang's contact edge surface to an entry edge, said entry edge generally adjacent said annular edge surface of said check ring so that said cam ramp surface increasingly axially protrudes from said check ring as it extends from said entry edge to said contact edge surface; and
   said flange edge surface of said retainer end contacting said cam ramp surface of said tang upon reverse rotation of said screw to seal said valve seat against said annular check valve seat member.

5. The valve assembly of claim 4 wherein said annular cam ramp surface extends as a helix.

6. The valve assembly of claim 5 wherein said flange edge surface includes cylindrical roller cams in rolling contact with said cam ramp surface.

7. A non-return valve assembly for use in an injection molding machine including a plasticating screw rotatably and axially movable within a barrel, said assembly comprising:
   a) a tip member having a threaded rearward end threadably engaging the forward end of the said plasticating screw of said machine, a configured forward retainer end and an intermediate rod portion between said forward and rearward ends;
   b) an annular check valve seat member adjacent said rearward end and fixed to the forward end of said plasticating screw when said rearward end is threadingly engaged with said plasticating screw;
   c) an annular check ring concentrically receiving said rod portion to axially and radially move relative to said rod portion between said forward and rearward ends of said tip member, said check ring having a valve seat formed on its axial read end to sealingly engage said check valve seat member;
   d) said retainer end of said tip member having a flange edge surface radially extending outwardly from said rod portion to laterally spaced ends and generally flat profile surfaces in the shape of an arrowhead extending from the ends of said flange edge surface; and
   e) said check ring having a forward end defined by a forward annular edge surface, at least two diametrically opposed tangs protruding from said forward annular edge surface; each tang having a contact edge surface axially extending from said forward annular edge surface a distance greater than the axial movement of said check ring relative to said rod portion and the contact edge surface of one tang spaced away from the contact edge surface of the other tang a distance equal to the distance of said tip member's flange edge surface between the ends thereof whereby said profile surfaces of said retainer end contact said contact edge surface of said tangs when said plasticating screw rotates to permit maximum flow of molding material through said check ring past said retainer end while permitting said check ring to freely float radially and axially move within said barrel.

8. In an injection molding machine including a cylindrical barrel having an outlet opening at open end thereof for injecting molding material into a mold; a plasticating screw disposed within said barrel; hopper means for feeding a molding material to said barrel; reversible motor means for rotating said screw; injection means for axially moving said screw within said barrel; control means for controlling said motor means and injection means; a non-return valve affixed to said screw between said barrel opening and said screw; the improvement comprising:

said valve having a tip member with a forward retainer end, a rearward end affixed to said screw so that said tip member rotates with said screw and an intermediate rod-shaped portion between said ends;

b) a valve seat member adjacent said rearward end of said tip member;

c) a check ring concentrically receiving said rod portion of said tip member and radially and axially movable between said forward end of said tip member and said valve seat member; and d) coupling means on said check ring and said forward end of said tip member for rotatingly coupling said check ring with said tip member when said motor means rotates said screw in a first direction whereby molding material is deposited in said barrel in front of said non-return valve while permitting said check ring to axially shift into sealing engagement with said valve seat member when reversing said direction of rotation of rotation of said screw.

9. The injection molding machine of claim 8 wherein said coupling means includes drive means for permitting said check ring to axially move relative to said rod portion of said tip member to seat against said retainer, and to move away therefrom.

10. The injection molding machine of claim 9 wherein said coupling means further includes cam means effective to positively move by mechanical contact said check ring into sealing contact with said valve seat member upon reversal of rotational direction of said screw; said screw motor means operative to drive said screw in said first rotational direction and said reverse rotational direction, said control means effective to control said reverse rotation at predetermined angular increments while maintaining fixed the axial position of said screw relative to said barrel.

11. The injection molding machine of claim 9 wherein said coupling means further includes cam means effective to positively move said check ring into sealing contact with said valve seat member upon reversal of rotational direction of said screw; said screw motor means operative to drive said screw in said first rotational direction and reverse said reverse rotational direction, said control means effective to control said reverse rotation at predetermined time increments while maintaining fixed the axial position of said screw relative to said barrel.

* * * * *